US011281648B2

(12) United States Patent
Haber et al.

(10) Patent No.: US 11,281,648 B2
(45) Date of Patent: Mar. 22, 2022

(54) TECHNOLOGIES FOR FLEXIBLE TREE-BASED LOOKUPS FOR NETWORK DEVICES

(71) Applicant: Intel Corporation, Santa Clara, CA (US)

(72) Inventors: Nir Haber, Haifa (IL); Lior Aloni, Mitzpe Aviv (IL); Eli Sorin, Mitzpe Aviv (IL)

(73) Assignee: Intel Corporation, Santa Clara, CA (US)

( * ) Notice: Subject to any disclaimer, the term of this patent is extended or adjusted under 35 U.S.C. 154(b) by 796 days.

(21) Appl. No.: 15/950,446

(22) Filed: Apr. 11, 2018

(65) Prior Publication Data

US 2019/0318022 A1 Oct. 17, 2019

(51) Int. Cl.
| | |
|---|---|
| *G06F 16/00* | (2019.01) |
| *G06F 16/22* | (2019.01) |
| *H04L 45/745* | (2022.01) |
| *H04L 69/22* | (2022.01) |

(52) U.S. Cl.
CPC ...... *G06F 16/2246* (2019.01); *G06F 16/2237* (2019.01); *H04L 45/745* (2013.01); *H04L 69/22* (2013.01)

(58) Field of Classification Search
CPC .................................................. G06F 16/2246
USPC .......................................................... 707/741
See application file for complete search history.

(56) References Cited

U.S. PATENT DOCUMENTS

| | | | | |
|---|---|---|---|---|
| 2006/0136570 A1* | 6/2006 | Pandya | ................... | H04L 69/16 709/217 |
| 2009/0190592 A1* | 7/2009 | Hsieh | ...................... | H04L 45/48 370/392 |
| 2014/0279806 A1* | 9/2014 | Ansari | .................... | H04L 45/00 706/47 |
| 2016/0147779 A1* | 5/2016 | Eguro | ............... | G06F 16/24539 707/694 |
| 2016/0197852 A1* | 7/2016 | Hutchison | ............... | H04L 45/74 370/392 |

(Continued)

OTHER PUBLICATIONS

Daly, James, et. al., "ByteCuts: Fast Packet Classification by Interior Bit Extraction", Department of Computer Science and Engineering, Michigan State University, Apr. 2018, 9 pages.

(Continued)

*Primary Examiner* — Alexandria Y Bromell
(74) *Attorney, Agent, or Firm* — Compass IP Law PC

(57) ABSTRACT

Technologies for flexible tree-based lookups include an network device that receives a network packet. The network device classifies the network packet to determine a packet type and extracts multiple fields from the network packet to generate a field vector. The fields are selected based on the packet type. The field vector includes words that are associated with the fields. The network device builds a tree representation of the field vector. The tree representation includes a leaf node corresponding to each word of the field vector and one or more root nodes. The network device executes an iterative lookup over the tree representation and, if matching, may perform an action associated with the iterative lookup. To execute the lookup, the network device may determine whether a search key for each node exactly matches a search rule, up to a root node. Other embodiments are described and claimed.

19 Claims, 3 Drawing Sheets

(56) References Cited

U.S. PATENT DOCUMENTS

2016/0359872 A1* 12/2016 Yadav ................. H04L 63/1425
　　　　　　　　　　　　　　　　　　　　　　　　707/707

OTHER PUBLICATIONS

Hager, Sven, et.al., "Trees in the List: Accelerating List-based Packet Classification Through Controlled Rule Set Expansion", ACM, CoNEXT'14, Dec. 2-5, 2014, Sydney, Australia. 7 pages.

Liu, Zhi, et. al., "BitCuts: A fast packet classification algorithm using bit-level cutting", ELSEVIER, Computer Communications 109 (2017) 38-52, Revised Mar. 21, 2017, 15 pages.

Vaish, Nilay, et. al., "Experiences in Co-designing a Packet Classification Algorithm and a Flexible Hardware Platform", Oct. 2011, 11 pages.

* cited by examiner

TECHNOLOGIES FOR FLEXIBLE TREE-BASED LOOKUPS FOR NETWORK DEVICES

BACKGROUND

Network devices such as hardware switches may perform lookup operations on network packets as they are processed. For example, a hardware switch may extract fields from incoming Ethernet packet headers and then search for those fields in an exact match table. Typical hardware switches may support a fixed number of search hierarchies or a fixed search algorithm For example, certain hardware switches manufactured by Intel® Corporation may support a fixed two-level search algorithm in which a first search is performed using parallel search resources, and then a second search is performed using parallel search resources.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
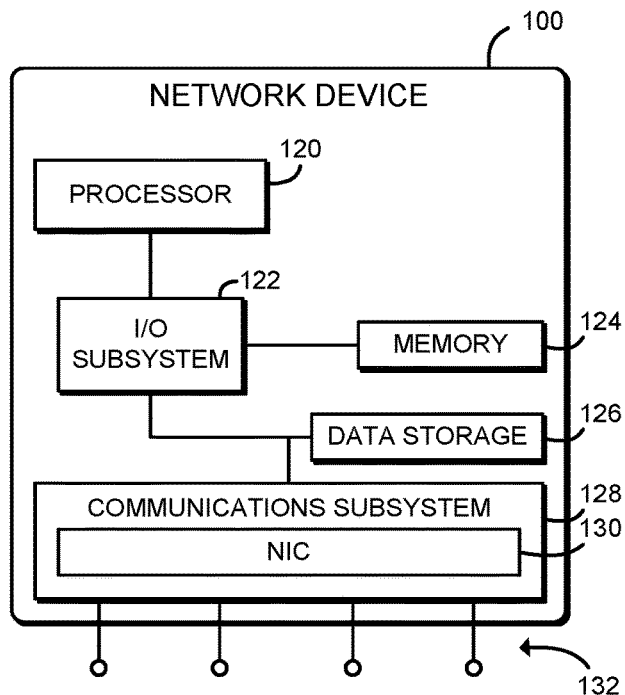
FIG. 1 is a simplified block diagram of at least one embodiment of a network device for flexible tree-based lookups.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a network device 100 processes network packets using flexible tree-based lookups. In use, as described further below, the network device 100 receives a network packet, classifies the network packet, and, based on the network packet type, extracts multiple header fields to form a field vector. The network device 100 generates a tree representation based on the field vector, and then performs an iterative lookup on the nodes of the tree representation. If a match is found, the network device 100 may perform one or more actions, such as forwarding actions or other network processing actions. Thus, the network device 100 may be configured with different search algorithms and/or search strategies for different packet types. Additionally, each lookup may be defined to include a flexible number of searches performed sequentially, for example by modifying the depth of the tree representation. The search performed by the network device 100 may be configured by the customer in the field. Thus, the network device 100 may support complex search templates in a flexible and scalable manner. The network device 100 may be configured and customized for customer requirements, without needing deep knowledge of internals of the network device 100. Thus, the network device 100 may support complex network applications including network function virtualization (NFV), software defined networking (SDN), and packet processing language compilers such as P4.

The network device 100 may be embodied as any type of network or other computer device capable of performing the functions described herein, including, without limitation, a switch, a managed switch, a computer, a server, a workstation, a mobile computing device, a network appliance, a web appliance, a distributed computing system, a processor-based system, and/or a consumer electronic device. As shown in FIG. 1, the network device 100 illustratively include a processor 120, an input/output subsystem 122, a memory 124, a data storage device 126, and a communication subsystem 128, and/or other components and devices commonly found in a server or similar computing device. Of course, the network device 100 may include other or additional components, such as those commonly found in a managed switch (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the network device 100, such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the network device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the network device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the network device 100 may be embodied as any network interface controller or other communication circuit, device, or collection thereof, capable of enabling communications between the network device 100 and other remote devices over a network. The communication subsystem 128 may be configured to use any one or more communication technology (e.g., wired or wireless communications) and associated protocols (e.g., Ethernet, InfiniBand®, Bluetooth®, Wi-Fi®, WiMAX, etc.) to effect such communication. The communication subsystem 128 illustratively includes a network interface controller (NIC) 130 and multiple network ports 132. The NIC 130 may include one or more network hardware resources, such as ingress queues, egress queues, crossbars, shared memory switches, Ethernet port logic, and other network hardware resources.

Figure 2:
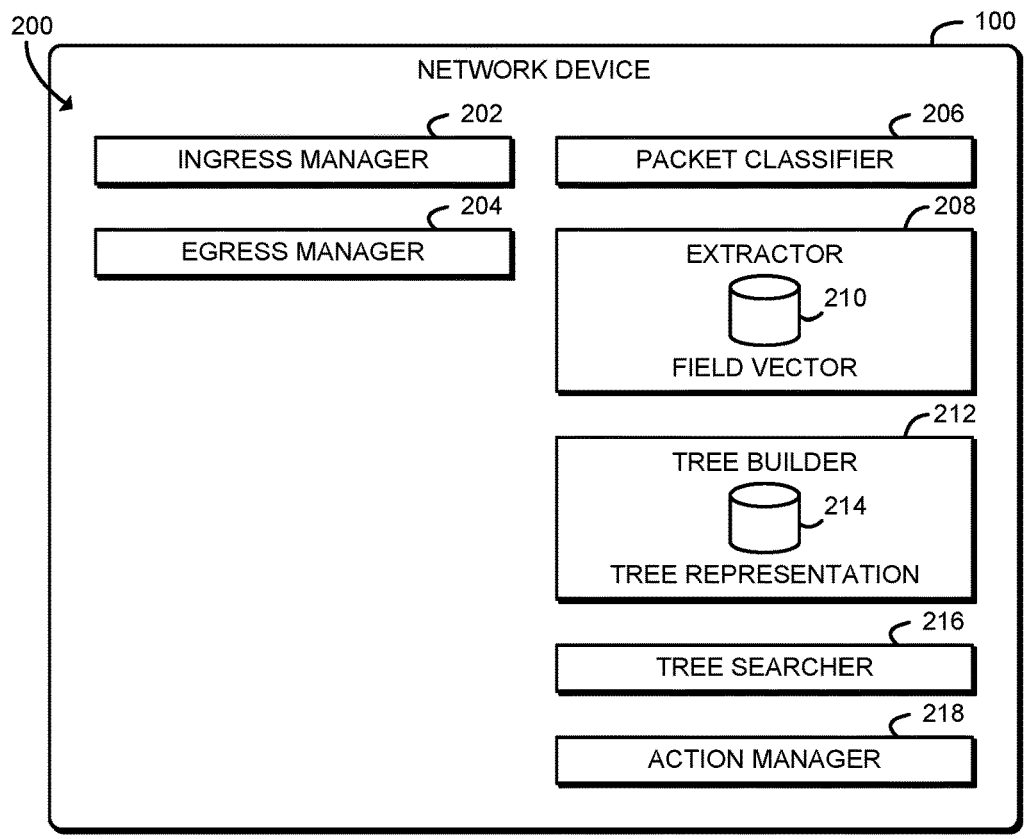
FIG. 2 is a simplified block diagram of at least one embodiment of an environment that may be established by the network device of FIG. 1.

Referring now to FIG. 2, in an illustrative embodiment, the network device 100 establishes an environment 200 during operation. The illustrative environment 200 includes an ingress manager 202, an egress manager 204, a packet classifier 206, an extractor 208, a tree builder 212, a tree searcher 216, and an action manager 218. The various components of the environment 200 may be embodied as hardware, firmware, software, or a combination thereof. As such, in some embodiments, one or more of the components of the environment 200 may be embodied as circuitry or collection of electrical devices (e.g., ingress manager circuitry 202, egress manager circuitry 204, packet classifier circuitry 206, extractor circuitry 208, tree builder circuitry 212, tree searcher circuitry 216, and/or action manager circuitry 218). It should be appreciated that, in such embodiments, one or more of the ingress manager circuitry 202, the egress manager circuitry 204, the packet classifier circuitry 206, the extractor circuitry 208, the tree builder circuitry 212, the tree searcher circuitry 216, and/or the action manager circuitry 218 may form a portion of one or more of the processor 120, the I/O subsystem 122, the communication subsystem 128, and/or other components of the network device 100. Additionally, in some embodiments, one or more of the illustrative components may form a portion of another component and/or one or more of the illustrative components may be independent of one another.

The ingress manager 202 is configured to receive a network packet, for example via one of the network ports 132. The egress manager 204 may be configured to transmit the network packet after performing any actions associated with a successful lookup, as described further below.

The packet classifier 206 is configured to determine a packet type of the network packet, for example after receiving the network packet. The packet type may be determined, for example, as a function of a network protocol of the network packet or a header field of the network packet. The extractor 208 is configured to extract multiple fields from the network packet to generate a field vector 210 in response to determining the packet type. The field vector 210 includes multiple words, and each word of the field vector 210 includes or otherwise corresponds to an extracted field from the network packet. The fields to be extracted are selected based on the packet type.

The tree builder 212 is configured to construct a tree representation 214 of the field vector 210. The tree representation 214 includes multiple nodes, which include multiple leaf nodes and at least one root node. Each leaf node corresponds to a word of the field vector 210. Constructing the tree representation 214 may include constructing a leaf node for each word of the field vector 210 and constructing one or more parent nodes, including the root nodes and in some embodiments, one or more branch nodes. Each of the parent nodes is associated with one or more child nodes, which may include the leaf nodes or the branch nodes.

The tree searcher 216 is configured to execute an iterative lookup over the tree representation 214 of the field vector 210 in response to constructing the tree representation 214. Executing the iterative lookup may include determining whether a search key associated with the child nodes of a particular node of the tree representation 214 exactly matches a search rule of a set of predetermined search rules. The search key for each leaf node includes the corresponding word of the field vector 210. Executing the iterative lookup may further include, in response to a match, determining whether the particular node is a root node of the tree representation 214. Executing the iterative lookup may further include identifying an action associated with the search rule if the particular node is a root node, as well as identifying another node in the tree representation 214 for an additional iteration of the iterative lookup (e.g., a sibling node or parent node) if the particular node is not a root node.

The action manager 218 is configured to determine whether the iterative lookup is a match and, if so, to perform the action associated with the iterative lookup (e.g., the action associated with one or more search rules that match a root node of the tree representation 214). The action performed may include a forwarding rule, a counter increment, a pruning action, a switch decision, or other packet processing action. The action manager 218 may be further configured to perform a default action if the iterative lookup is not a match.

Figure 3:
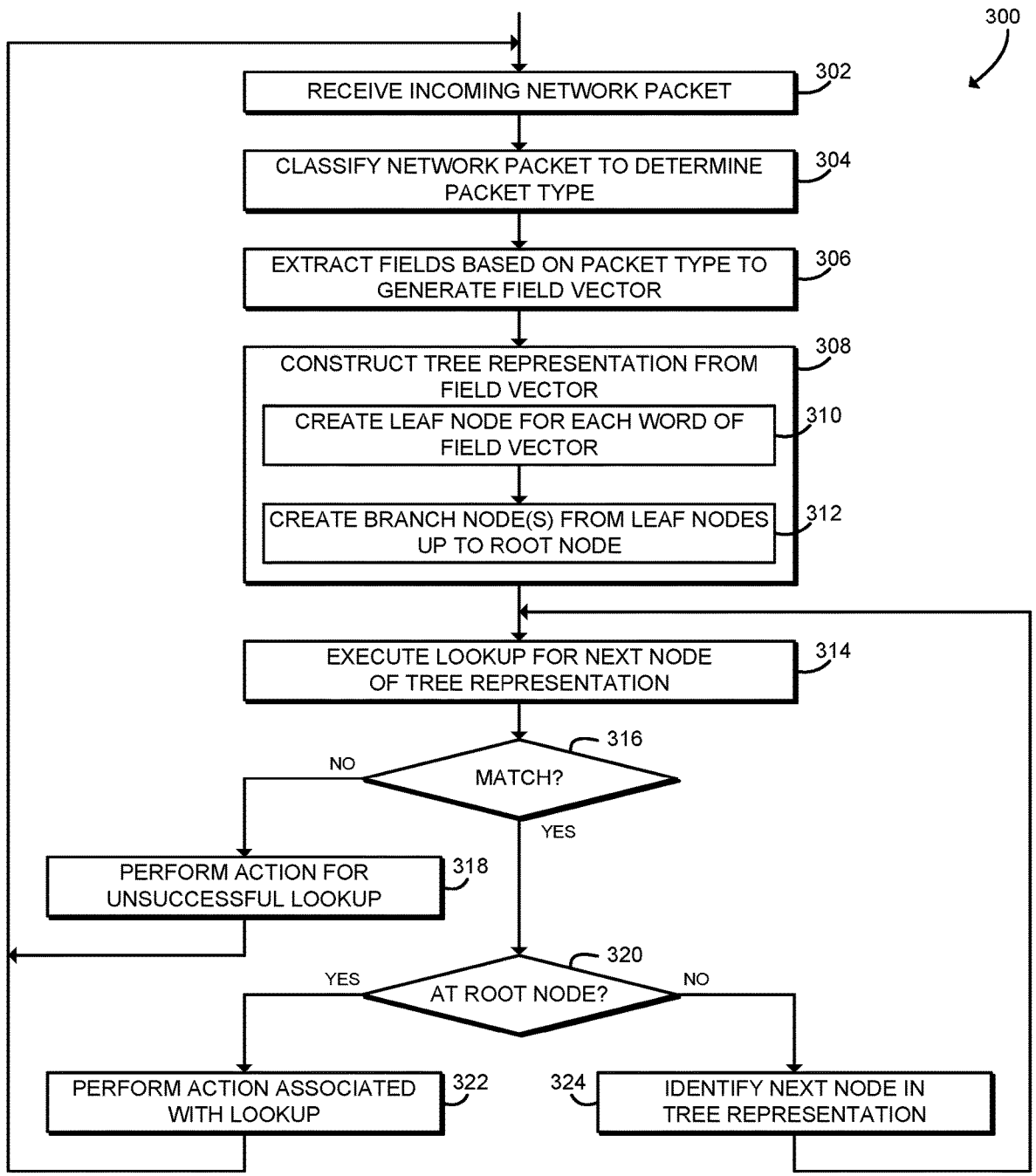
FIG. 3 is a simplified flow diagram of at least one embodiment of a method for flexible tree-based lookups that may be performed by the network device of FIGS. 1-2.

Referring now to FIG. 3, in use, the network device 100 may execute a method 300 for tree-based lookups. It should be appreciated that, in some embodiments, the operations of the method 300 may be performed by one or more components of the environment 200 of the network device 100 as shown in FIG. 2. The method 300 begins in block 302, in which the network device 100 receives an incoming network packet. The network packet may be embodied as, for example, an incoming Ethernet frame or other network data packet received by a network port 132 of the network device 100. In block 304, the network device 100 classifies the network packet to determine a packet type. The network device 100 may determine the packet type based on an identified network protocol of the packet (e.g., IPv4, IPv6, TCP, or other protocol) or based on various flags, fields, or other data included in one or more headers of the network packet.

In block 306, the network device 100 extracts one or more fields from the network packet based on the identified packet type. Each field may be extracted from a particular bit position, octet position, or other location in the network packet. The fields may be extracted from different sections of the network packet, including from different headers and/or payload sections. The particular fields to be extracted may be determined based on the identified packet type, for example by an extraction recipe or other field definition associated with the packet type. The extracted fields are collected to generate the field vector 210. Illustrative, the field vector 210 may be embodied as a vector of 16-bit words, with each word including data extracted from a particular field of the network packet.

In block 308, the network device 100 constructs a tree representation 214 from the field vector 210. The tree representation 214 includes multiple nodes. Each node may be associated with multiple child nodes and up to one parent node. The maximum number of child nodes per node (e.g., two children, three children, etc.) may be predetermined for particular embodiments of the network device 100. The particular tree shape of the tree representation 214 may depend on the packet type of the network packet, for example based on the number of extracted fields (words) included in the field vector 210 for the identified packet type.

To construct the tree representation 214, in block 310 the network device 100 creates a leaf node for each word of the field vector 210. In block 312, the network device 100 creates branch nodes for groups of leaf nodes and other branch nodes. The network device 100 continues to create branch nodes for groups of leaf nodes and other branch nodes until reaching the last group, which corresponds to a root node. The completed tree representation 214 may include one or more root nodes. As described below, each root node represents a complete iterative lookup.

In block 314, the network device 100 executes a lookup for a next node of the tree representation 214. The lookup may begin with a leaf node and/or a branch node that includes only leaf nodes as children. The lookup may include performing an exact match search for a search rule, based on a search key for the current node. The search key may be generated based on the child nodes of the current node. For example, given that the current node is a branch node with multiple leaf nodes as children, the search key may include the corresponding words of the field vector 210 for the child nodes, and the network device 100 may search for a search rule exactly matching those words. Search rules may be included in an exact match table or other data structure, and may be configured after deployment of the network device 100, for example by a network administrator or other user of the network device 100.

In block 316, the network device 100 determines whether a match for the lookup was found. If so, the method 300 advances to block 320, described below. If a match for the lookup was not found, the method 300 branches to block 318, in which the network device 100 may perform a default action associated with an unsuccessful lookup. For example, the network device 100 may drop the network packet, log the packet, forward the network packet to an administrator for analysis, or perform another predetermined action. After performing the default action, the method 300 loops back to block 300 to process additional incoming network packets.

Referring back to block 316, if a match for the current node is found, the method 300 advances to block 320, in which the network device 100 determines whether the current node is a root node. For example, root nodes of the tree representation may not be associated with any parent nodes. If the current node is a root node, the method 300 branches to block 322, in which the network device 100 performs an action associated with the successful lookup. For example, the search rule that matches the root node may be associated with an action. Performing the action may include performing a forwarding rule, making a switching decision, and/or performing another packet processing operation (e.g., incrementing a counter, performing a pruning operation, or other operation). In some embodiments, the network packet may be forwarded to a network port 132 for transmission. After performing the matching action, the method 300 loops back to block 300 to process additional incoming network packets.

Referring back to block 320, if the current node is not a root node, the method 300 branches to block 324, in which the network device 100 identifies a next node in the tree representation 214. The network device 100 may use any algorithm or other technique for traversing the tree representation 214. For example, the network device 100 may select a parent node or sibling node of the current node as the next node for search. After identifying the next node, the method 300 loops back to block 314 to execute a lookup for the next node. Thus, the method 300 may traverse the tree representation 214 until a matching root is found or until no node matches. Accordingly, the network device 100 may execute multiple sequential searches based on the tree representation 214 until a match is found.

Figure 4:
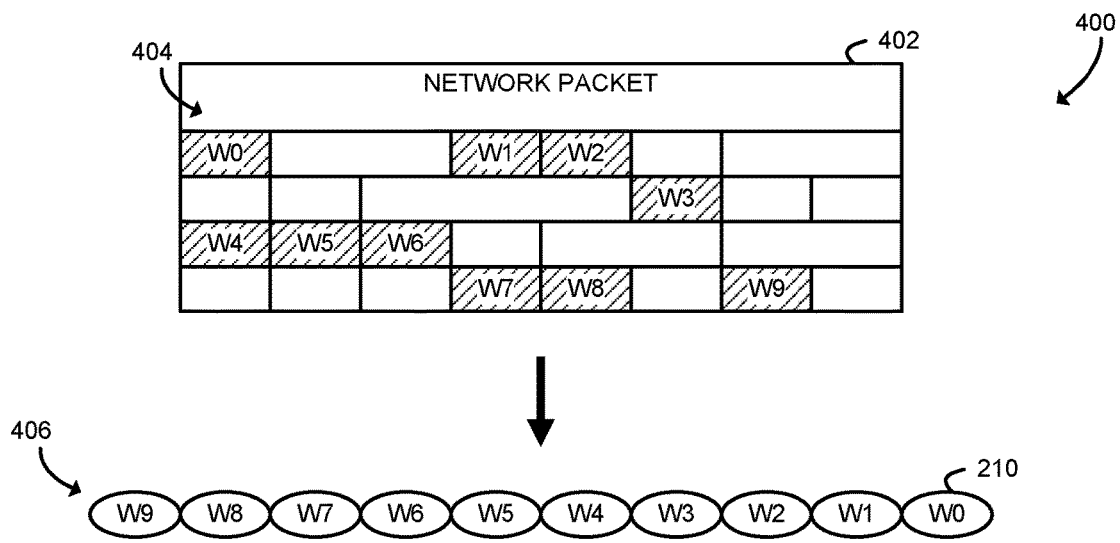
FIG. 4 is a schematic diagram of packet parsing that may be performed by the network device of FIGS. 1-3.

Referring now to FIG. 4, diagram 400 illustrates packet parsing that may be performed by the network device 100. The diagram 400 illustrates an incoming network packet 402, which includes multiple fields 404. Each of the fields 404 is shown in the diagram 400 as a word W0 through W9, located at a particular position in the network packet 402. The fields 404 may be included in multiple headers, payload sections, or other parts of the network packet 402. As described above, the location and number of the fields 404 may be determined based on the packet type of the network packet 402. As shown, the fields 404 are extracted from the network packet 402 and collected in the field vector 210. The field vector 210 may be embodied as an array, buffer, digital signal, or other vector of words 406. As shown, each of the words 406 includes the data extracted from the fields 404, illustratively labeled as words W0 through W9.

Figure 5:
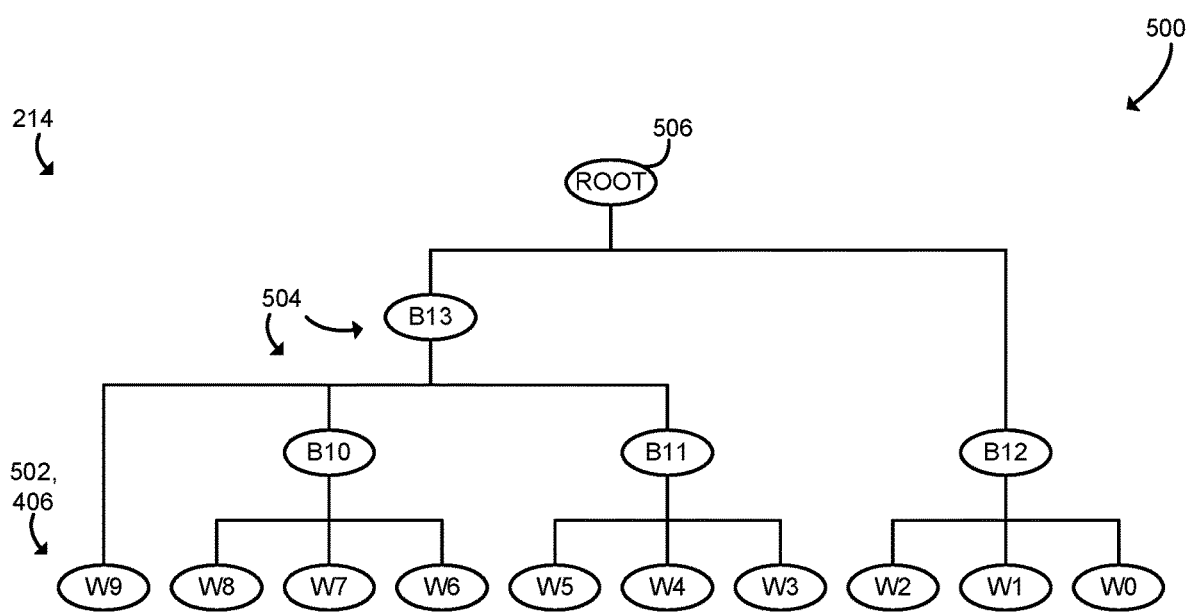
FIG. 5 is a schematic diagram of an illustrative tree representation that may be generated by the network device of FIGS. 1-3.

Referring now to FIG. 5, diagram 500 illustrates a tree representation 214 that may be generated from the field vector 210 shown in FIG. 4. As shown, the illustrative tree representation 214 is a 3-ary tree that includes leaf nodes 502, branch nodes 504, and a single root node 506. Each of the leaf nodes 502 corresponds to a word 406 of the field vector 210, shown as words W0 through W9. Each of the branch nodes 504 is associated with multiple child nodes (which may include leaf nodes 502 or other branch nodes 504) and a parent node. Illustratively, the branch nodes 504 include node B10, which is parent to nodes W8, W7, and W6; node B11, which is parent to nodes W5, W4, and W3; node B12, which is parent to nodes W2, W1, and W0; and node B13, which is parent to nodes W9, B10, and B11. As shown, the tree representation 214 includes the single root node 506, which is parent to nodes B13 and B12.

Figure 6:
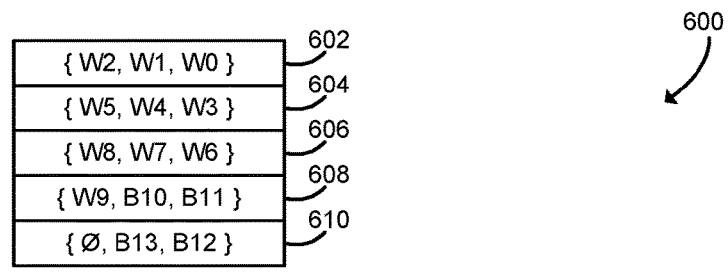
FIG. 6 is a schematic diagram of illustrative searches that may be performed by the network device of FIGS. 1-3.

Referring now to FIG. 6, diagram 600 illustrates an iterative lookup that may be performed over the illustrative tree representation 214 of FIG. 5. As shown, the network device 100 first performs lookup 602, which corresponds to the node B12. The network device 100 may create or otherwise identify a tuple {W2, W1, W0} corresponding to the words associated with the child nodes of node B12, and then perform an exact match lookup using that tuple. Next, if the lookup 602 is successful, the network device 100 performs lookup 604, which corresponds to the node B11 and the tuple {W5, W4, W3 }. If the lookup 604 is successful, the network device 100 may next perform lookup 606, which corresponds to the node B10 and the tuple {W8, W7, W6}.

If the lookup 606 is successful, the network device 100 may next perform the lookup 608, which corresponds to the node B13. The network device 100 may create a tuple {W9, B10, B11} to use as a search key or other search data for the lookup 608. The search key may be based on the word W9 from the field vector 210, as well as other search key data associated with the branch nodes B10, B11. For example, the search key data for the branches B10, B11 may be determined based on the result of the lookups 606, 604, respectively. If the lookup 608 is successful, the network device 100 next performs the lookup 610 for the root node 506. As shown, the network device 100 may create a tuple {⌊, B13, B12} to use as the search key. Because the root node 506 has only two child nodes, part of the tuple may be null or otherwise disregarded. The search key data for the branches B13, B12 may be determined based on the result of the lookups 608, 602 respectively. If the lookup 610 is successful, then all five lookups 602, 604, 606, 608, 610 were successful and the iterative lookup is considered a match. As described above, the network device 100 may perform an action that matches the root node 506. Thus, in the illustrative embodiment the network device 100 performed an iterative lookup that included multiple lookups performed sequentially. Thus, the network device 100 may enable flexible, configurable lookups for packet processing applications.

It should be appreciated that, in some embodiments, the method 300 may be embodied as various instructions stored on a computer-readable media, which may be executed by the processor 120, the I/O subsystem 122, the communication subsystem 128, and/or other components of the network device 100 to cause the network device 100 to perform the method 300. The computer-readable media may be embodied as any type of media capable of being read by the network device 100 including, but not limited to, the memory 124, the data storage device 126, firmware devices, and/or other media.

EXAMPLES

Illustrative examples of the technologies disclosed herein are provided below. An embodiment of the technologies may include any one or more, and any combination of, the examples described below.

Example 1 includes a network device for network packet processing, the network device comprising: a packet classifier to determine a packet type of a network packet; an extractor to extract a plurality of fields from the network packet to generate a field vector in response to determining the packet type, wherein the field vector includes a plurality of words, wherein each word of the field vector comprises a field of the plurality of fields, and wherein the plurality of fields are selected based on the packet type; a tree builder to construct a tree representation of the field vector, wherein the tree representation includes a plurality of nodes, wherein the nodes include a plurality of leaf nodes and one or more root nodes, and wherein each leaf node corresponds to a word of the field vector; a tree searcher to execute an iterative lookup over the tree representation of the field vector in response to construction of the tree representation; and an action manager to (i) determine whether the iterative lookup is a match in response to execution of the iterative lookup and (ii) perform an action associated with the iterative lookup in response to a determination that the iterative lookup is a match.

Example 2 includes the subject matter of Example 1, and wherein to construct the tree representation comprises to: construct a leaf node for each word of the field vector; and construct one or more parent nodes, wherein the one or more parent nodes include the one or more root nodes and zero or more branch nodes, wherein each of the parent nodes associated with one or more child nodes, wherein the one or more child nodes include leaf nodes or branch nodes.

Example 3 includes the subject matter of any of Examples 1 and 2, and wherein to execute the iterative lookup over the tree representation comprises to: determine whether a search key associated with one or more child nodes of a first node of the tree representation exactly matches a search rule of a plurality of search rules, wherein the search key for each leaf node of the tree representation comprises the corresponding word of the field vector; determine whether the first node is a root node of the tree representation in response to a determination that the search key exactly matches the search rule; identify a next node in the tree representation for the iterative lookup in response to a determination that the first node is not a root node; and identify the action associated with the search rule in response to a determination that the first node is a root node.

Example 4 includes the subject matter of any of Examples 1-3, and wherein to perform the action associated with the iterative lookup comprises to perform the action associated with the search rule in response to identification of the action associated with the search rule.

Example 5 includes the subject matter of any of Examples 1-4, and wherein to identify the next node comprises to identify a sibling node of the first node or a parent node of the first node.

Example 6 includes the subject matter of any of Examples 1-5, and wherein to determine the packet type comprises to determine the packet type as a function of a network protocol of the network packet or a header field of the network packet.

Example 7 includes the subject matter of any of Examples 1-6, and further comprising: an ingress manager to receive the network packet; wherein to determine the packet type comprises to determine the packet type in response to receipt of the network packet.

Example 8 includes the subject matter of any of Examples 1-7, and further comprising an egress manager to transmit the network packet in response to performance of the action associated with the iterative lookup.

Example 9 includes the subject matter of any of Examples 1-8, and wherein the action comprises a forwarding rule.

Example 10 includes the subject matter of any of Examples 1-9, and wherein the action comprises a counter increment action or a pruning action.

Example 11 includes the subject matter of any of Examples 1-10, and wherein the action manager is further to perform a default action in response to a determination that the iterative lookup is not a match.

Example 12 includes the subject matter of any of Examples 1-11, and wherein the network device comprises a hardware switch, and wherein the hardware switch comprises the packet classifier, the extractor, the tree builder, the tree searcher, and the action manager.

Example 13 includes a method for network packet processing, the method comprising: determining, by a network device, a packet type of a network packet; extracting, by the network device, a plurality of fields from the network packet to generate a field vector in response to determining the packet type, wherein the field vector includes a plurality of words, wherein each word of the field vector comprises a field of the plurality of fields, and wherein the plurality of fields are selected based on the packet type; constructing, by the network device, a tree representation of the field vector, wherein the tree representation includes a plurality of nodes, wherein the nodes include a plurality of leaf nodes and one or more root nodes, and wherein each leaf node corresponds to a word of the field vector; executing, by the network device, an iterative lookup over the tree representation of the field vector in response to constructing the tree representation; determining, by the network device, whether the iterative lookup is a match in response to executing the iterative lookup; and performing, by the network device, an action associated with the iterative lookup in response to determining that the iterative lookup is a match.

Example 14 includes the subject matter of Example 13, and wherein constructing the tree representation comprises: constructing a leaf node for each word of the field vector; and constructing one or more parent nodes, wherein the one or more parent nodes include the one or more root nodes and zero or more branch nodes, wherein each of the parent nodes associated with one or more child nodes, wherein the one or more child nodes include leaf nodes or branch nodes.

Example 15 includes the subject matter of any of Examples 13 and 14, and wherein executing the iterative lookup over the tree representation comprises: determining whether a search key associated with one or more child nodes of a first node of the tree representation exactly matches a search rule of a plurality of search rules, wherein the search key for each leaf node of the tree representation comprises the corresponding word of the field vector; determining whether the first node is a root node of the tree representation in response to determining that the search key exactly matches the search rule; identifying a next node in the tree representation for the iterative lookup in response to determining that the first node is not a root node; and identifying the action associated with the search rule in response to determining that the first node is a root node.

Example 16 includes the subject matter of any of Examples 13-15, and wherein performing the action associated with the iterative lookup comprises performing the action associated with the search rule in response to identifying the action associated with the search rule.

Example 17 includes the subject matter of any of Examples 13-16, and wherein identifying the next node comprises identifying a sibling node of the first node or a parent node of the first node.

Example 18 includes the subject matter of any of Examples 13-17, and wherein determining the packet type comprises determining the packet type as a function of a network protocol of the network packet or a header field of the network packet.

Example 19 includes the subject matter of any of Examples 13-18, and further comprising: receiving, by the network device, the network packet; wherein determining the packet type comprises determining the packet type in response to receiving the network packet.

Example 20 includes the subject matter of any of Examples 13-19, and further comprising transmitting, by the network device, the network packet in response to performing the action associated with the iterative lookup.

Example 21 includes the subject matter of any of Examples 13-20, and wherein the action comprises a forwarding rule.

Example 22 includes the subject matter of any of Examples 13-21, and wherein the action comprises a counter increment action or a pruning action.

Example 23 includes the subject matter of any of Examples 13-22, and further comprising performing, by the network device, a default action in response to determining that the iterative lookup is not a match.

Example 24 includes the subject matter of any of Examples 13-23, and wherein the network device comprises a hardware switch.

Example 25 includes one or more computer-readable storage media comprising a plurality of instructions stored thereon that, in response to being executed, cause a network device to: determine a packet type of a network packet; extract a plurality of fields from the network packet to generate a field vector in response to determining the packet type, wherein the field vector includes a plurality of words, wherein each word of the field vector comprises a field of the plurality of fields, and wherein the plurality of fields are selected based on the packet type; construct a tree representation of the field vector, wherein the tree representation includes a plurality of nodes, wherein the nodes include a plurality of leaf nodes and one or more root nodes, and wherein each leaf node corresponds to a word of the field vector; execute an iterative lookup over the tree representation of the field vector in response to constructing the tree representation; determine whether the iterative lookup is a match in response to executing the iterative lookup; and perform an action associated with the iterative lookup in response to determining that the iterative lookup is a match.

Example 26 includes the subject matter of Example 25, and wherein to construct the tree representation comprises to: construct a leaf node for each word of the field vector; and construct one or more parent nodes, wherein the one or more parent nodes include the one or more root nodes and zero or more branch nodes, wherein each of the parent nodes associated with one or more child nodes, wherein the one or more child nodes include leaf nodes or branch nodes.

Example 27 includes the subject matter of any of Examples 25 and 26, and wherein to execute the iterative lookup over the tree representation comprises to: determine whether a search key associated with one or more child nodes of a first node of the tree representation exactly matches a search rule of a plurality of search rules, wherein the search key for each leaf node of the tree representation comprises the corresponding word of the field vector; determine whether the first node is a root node of the tree representation in response to determining that the search key exactly matches the search rule; identify a next node in the tree representation for the iterative lookup in response to determining that the first node is not a root node; and identify the action associated with the search rule in response to determining that the first node is a root node.

Example 28 includes the subject matter of any of Examples 25-27, and wherein to perform the action associated with the iterative lookup comprises to perform the action associated with the search rule in response to identifying the action associated with the search rule.

Example 29 includes the subject matter of any of Examples 25-28, and wherein to identify the next node comprises to identify a sibling node of the first node or a parent node of the first node.

Example 30 includes the subject matter of any of Examples 25-29, and wherein to determine the packet type comprises to determine the packet type as a function of a network protocol of the network packet or a header field of the network packet.

Example 31 includes the subject matter of any of Examples 25-30, and further comprising a plurality of instructions stored thereon that, in response to being executed, cause the network device to: receive the network packet; wherein to determine the packet type comprises to determine the packet type in response to receiving the network packet.

Example 32 includes the subject matter of any of Examples 25-31, and further comprising a plurality of instructions stored thereon that, in response to being executed, cause the network device to transmit the network packet in response to performing the action associated with the iterative lookup.

Example 33 includes the subject matter of any of Examples 25-32, and wherein the action comprises a forwarding rule.

Example 34 includes the subject matter of any of Examples 25-33, and wherein the action comprises a counter increment action or a pruning action.

Example 35 includes the subject matter of any of Examples 25-34, and further comprising a plurality of instructions stored thereon that, in response to being executed, cause the network device to perform a default action in response to determining that the iterative lookup is not a match.

Example 36 includes the subject matter of any of Examples 25-35, and wherein the network device comprises a hardware switch.

The invention claimed is:

1. A network device for network packet processing, the network device comprising:
   circuitry to determine a packet type of a network packet;
   circuitry to extract a plurality of fields from the network packet to generate a field vector in response to determining the packet type, wherein the field vector includes a plurality of elements, wherein at least one element of the field vector comprises a field of the plurality of fields, and wherein the plurality of fields are selected based on the packet type;
   circuitry to construct a tree representation of the field vector, wherein the tree representation includes a plurality of nodes, wherein the nodes include a plurality of leaf nodes and one or more root nodes, and wherein at least one leaf node corresponds to an element of the field vector;
   circuitry to execute a lookup over the tree representation of the field vector in response to construction of the tree representation; and
   circuitry to (i) determine whether the lookup is a match in response to execution of the lookup and (ii) perform an action associated with the lookup in response to a determination that the iterative lookup is a match, wherein to execute the lookup over the tree representation of the field vector comprises to:
      determine whether a search key associated with one or more child nodes of a first node of the tree representation exactly matches a search rule of a plurality of search rules, wherein the search key for at least one leaf node of the tree representation comprises a corresponding element of the field vector; and
      identify the action associated with the search rule in response to a determination that the first node is a root node.

2. The network device of claim 1, wherein to construct the tree representation comprises to:
   construct a leaf node for at least one element of the field vector; and
   construct one or more parent nodes, wherein the one or more parent nodes include the one or more root nodes and zero or more branch nodes, wherein at least one of the parent nodes is associated with one or more child nodes, wherein the one or more child nodes include leaf nodes or branch nodes.

3. The network device of claim 1, wherein to perform the action associated with the lookup comprises to perform the action associated with the search rule in response to identification of the action associated with the search rule.

4. The network device of claim 1, wherein to determine the packet type comprises to determine the packet type as a function of a network protocol of the network packet or a header field of the network packet.

5. The network device of claim 1, further comprising:
   circuitry to receive the network packet;
   wherein to determine the packet type comprises to determine the packet type in response to receipt of the network packet.

6. The network device of claim 5, further comprising circuitry to transmit the network packet in response to performance of the action associated with the lookup.

7. The network device of claim 1, wherein the action comprises a forwarding rule.

8. The network device of claim 1, wherein the action comprises a counter increment action or a pruning action.

9. The network device of claim 1, wherein the circuitry to (i) determine whether the lookup is a match in response to execution of the lookup and (ii) perform an action associated with the lookup in response to a determination that the lookup is a match is further to perform a default action in response to a determination that the lookup is not a match.

10. The network device of claim 1, wherein the network device comprises a hardware switch, and wherein the hardware switch comprises the circuitry to determine a packet type of a network packet, the circuitry to extract a plurality of fields from the network packet to generate a field vector in response to determining the packet type, the circuitry to construct a tree representation of the field vector, circuitry to execute an lookup over the tree representation of the field vector in response to construction of the tree representation, and circuitry to (i) determine whether the lookup is a match in response to execution of the lookup and (ii) perform an action associated with the lookup in response to a determination that the lookup is a match.

11. A method for network packet processing, the method comprising:
   determining, by a network device, a packet type of a network packet;
   extracting, by the network device, a plurality of fields from the network packet to generate a field vector in response to determining the packet type, wherein the field vector includes a plurality of elements, wherein at least one element of the field vector comprises a field of the plurality of fields, and wherein the plurality of fields are selected based on the packet type;
   constructing, by the network device, a tree representation of the field vector, wherein the tree representation includes a plurality of nodes, wherein the nodes include a plurality of leaf nodes and one or more root nodes, and wherein at least one leaf node corresponds to an element of the field vector;
   executing, by the network device, an lookup over the tree representation of the field vector in response to constructing the tree representation;
   determining, by the network device, whether the lookup is a match in response to executing the lookup; and
   performing, by the network device, an action associated with the lookup in response to determining that the lookup is a match, wherein executing the lookup over the tree representation of the field vector in response to constructing the tree representation comprises:
      determining whether a search key associated with one or more child nodes of a first node of the tree representation exactly matches a search rule of a plurality of search rules, wherein the search key for at least one leaf node of the tree representation comprises a corresponding element of the field vector and
      identifying the action associated with the search rule in response to determining that the first node is a root node.

12. The method of claim 11, wherein constructing the tree representation comprises:
   constructing a leaf node for at least one element of the field vector; and
   constructing one or more parent nodes, wherein the one or more parent nodes include the one or more root nodes and zero or more branch nodes, wherein at least one of the parent nodes associated with one or more child nodes, wherein the one or more child nodes include leaf nodes or branch nodes.

13. The method of claim 11, wherein determining the packet type comprises determining the packet type as a function of a network protocol of the network packet or a header field of the network packet.

14. The method of claim 11, wherein the action comprises a forwarding rule.

15. One or more non-transitory computer-readable storage media comprising a plurality of instructions stored thereon that, in response to being executed, cause a network device to:
   determine a packet type of a network packet;
   extract a plurality of fields from the network packet to generate a field vector in response to determining the packet type, wherein the field vector includes a plurality of elements, wherein at least one element of the field vector comprises a field of the plurality of fields, and wherein the plurality of fields are selected based on the packet type;
   construct a tree representation of the field vector, wherein the tree representation includes a plurality of nodes, wherein the nodes include a plurality of leaf nodes and one or more root nodes, and wherein at least one leaf node corresponds to a element of the field vector;
   execute an lookup over the tree representation of the field vector in response to constructing the tree representation;
   determine whether the lookup is a match in response to executing the lookup; and
   perform an action associated with the lookup in response to determining that the iterative lookup is a match, wherein to execute the lookup over the tree representation comprises:
   determine whether a search key associated with one or more child nodes of a first node of the tree representation exactly matches a search rule of a plurality of search rules, wherein the search key for at least one leaf node of the tree representation comprises a corresponding element of the field vector and
   identify the action associated with the search rule in response to determining that the first node is a root node.

16. The one or more computer-readable storage media of claim 15, wherein to construct the tree representation comprises to:
   construct a leaf node for at least one element of the field vector; and
   construct one or more parent nodes, wherein the one or more parent nodes include the one or more root nodes and zero or more branch nodes, wherein at least one of the parent nodes associated with one or more child nodes, wherein the one or more child nodes include leaf nodes or branch nodes.

17. The one or more computer-readable storage media of claim 15, wherein to determine the packet type comprises to determine the packet type as a function of a network protocol of the network packet or a header field of the network packet.

18. The one or more computer-readable storage media of claim 15, wherein the action comprises a forwarding rule.

19. The one or more computer-readable storage media of claim 15, wherein the action comprises a counter increment action or a pruning action.

* * * * *

UNITED STATES PATENT AND TRADEMARK OFFICE
CERTIFICATE OF CORRECTION

PATENT NO. : 11,281,648 B2
APPLICATION NO. : 15/950446
DATED : March 22, 2022
INVENTOR(S) : Nir Haber, Lior Aloni and Eli Sorin It is certified that error appears in the above-identified patent and that said Letters Patent is hereby corrected as shown below:

In the Claims

Amend Claim 1 to read:
A network device for network packet processing, the network device comprising:
    circuitry to determine a packet type of a network packet;
    circuitry to extract a plurality of fields from the network packet to generate a field vector in response to determining the packet type, wherein the field vector includes a plurality of elements, wherein at least one element of the field vector comprises a field of the plurality of fields, and wherein the plurality of fields are selected based on the packet type;
    circuitry to construct a tree representation of the field vector, wherein the tree representation includes a plurality of nodes, wherein the nodes include a plurality of leaf nodes and one or more root nodes, and wherein at least one leaf node corresponds to an element of the field vector;
    circuitry to execute a lookup over the tree representation of the field vector in response to construction of the tree representation; and
    circuitry to (i) determine whether the lookup is a match in response to execution of the lookup and (ii) perform an action associated with the lookup in response to a determination that the lookup is a match, wherein to execute the lookup over the tree representation of the field vector comprises to:
        determine whether a search key associated with one or more child nodes of a first node of the tree representation exactly matches a search rule of a plurality of search rules, wherein the search key for at least one leaf node of the tree representation comprises a corresponding element of the field vector; and
        identify the action associated with the search rule in response to a determination that the first node is a root node.

Amend Claim 15 to read:
One or more non-transitory computer-readable storage media comprising a plurality of instructions stored thereon that, in response to being executed, cause a network device to:
    determine a packet type of a network packet;
    extract a plurality of fields from the network packet to generate a field vector in response to determining the packet type, wherein the field vector includes a plurality of elements, wherein at least Signed and Sealed this
Eighth Day of November, 2022

Katherine Kelly Vidal
*Director of the United States Patent and Trademark Office* one element of the field vector comprises a field of the plurality of fields, and wherein the plurality of fields are selected based on the packet type;

construct a tree representation of the field vector, wherein the tree representation includes a plurality of nodes, wherein the nodes include a plurality of leaf nodes and one or more root nodes, and wherein at least one leaf node corresponds to a element of the field vector;

execute a lookup over the tree representation of the field vector in response to constructing the tree representation;

determine whether the lookup is a match in response to executing the lookup; and perform an action associated with the lookup in response to determining that the lookup is a match, wherein to execute the lookup over the tree representation comprises:

determine whether a search key associated with one or more child nodes of a first node of the tree representation exactly matches a search rule of a plurality of search rules, wherein the search key for at least one leaf node of the tree representation comprises a corresponding element of the field vector and identify the action associated with the search rule in response to determining that the first node is a root node.